(12) United States Patent
Konishi et al.

(10) Patent No.: US 11,198,059 B2
(45) Date of Patent: Dec. 14, 2021

(54) VIBRATION CONTROL APPARATUS, VIBRATION CONTROL METHOD, AND PROGRAM

(71) Applicant: Sony Interactive Entertainment Inc., Tokyo (JP)

(72) Inventors: Yukari Konishi, Tokyo (JP); Yusuke Nakagawa, Kanagawa (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/632,588

(22) PCT Filed: Aug. 29, 2017

(86) PCT No.: PCT/JP2017/030909
§ 371 (c)(1),
(2) Date: Jan. 21, 2020

(87) PCT Pub. No.: WO2019/043781
PCT Pub. Date: Mar. 7, 2019

(65) Prior Publication Data
US 2020/0238169 A1    Jul. 30, 2020

(51) Int. Cl.
*A63F 13/20* (2014.01)
*A63F 13/285* (2014.01)
*G06F 3/01* (2006.01)

(52) U.S. Cl.
CPC .......... *A63F 13/285* (2014.09); *G06F 3/016* (2013.01); *A63F 2300/1037* (2013.01)

(58) Field of Classification Search
CPC .......... A63F 13/20; A63F 13/23; A63F 13/25; A63F 13/28; A63F 13/285; A63F 13/40;
(Continued)

(56) References Cited

U.S. PATENT DOCUMENTS 5,889,670 A   3/1999  Schuler
6,766,299 B1  7/2004  Bellomo
(Continued)

FOREIGN PATENT DOCUMENTS

JP   0884858 A    4/1996
JP   11226265 A   8/1999
(Continued)

OTHER PUBLICATIONS

International Preliminary Report on Patentability and Written Opinion for related PCT Application No. PCT/JP2017/015563, 13 pages, dated Oct. 31, 2019.
(Continued)

*Primary Examiner* — Omkar A Deodhar
(74) *Attorney, Agent, or Firm* — Matthew B. Dernier, Esq.

(57) ABSTRACT

Provided is a vibration control apparatus for controlling a vibration mechanism. The vibration control apparatus receives, from a user, correction information specifying a correction to be made when the vibration mechanism is to be vibrated, acquires tactile sensory vibration data descriptive of a vibration causing the user to feel a tactile sensation, obtains corrected vibration data by correcting the acquired tactile sensory vibration data in accordance with the correction information, and vibrates the vibration mechanism by using the corrected vibration data.

8 Claims, 2 Drawing Sheets

(58) Field of Classification Search
CPC .......... A63F 13/44; A63F 13/45; A63F 13/50;
A63F 13/70; A63F 2300/30; A63F
2300/57; A63F 2300/807; A63F
2300/8082; A63F 2300/1037; G05B
2219/40132
See application file for complete search history.

(56) References Cited

U.S. PATENT DOCUMENTS

| | | |
|---|---|---|
| 6,864,877 B2 | 3/2005 | Braun |
| 7,010,488 B2 | 3/2006 | van Santen |
| 7,218,310 B2 | 5/2007 | Goldenberg |
| 8,248,218 B2 | 8/2012 | Yamaya |
| 8,249,276 B2 | 8/2012 | Hamada |
| 8,325,144 B1 | 12/2012 | Tierling |
| 8,479,274 B2 | 7/2013 | Furukawa |
| 8,487,759 B2 | 7/2013 | Hill |
| 8,727,878 B2 | 5/2014 | Longdale |
| 8,787,586 B2 | 7/2014 | Hamada |
| 9,070,282 B2 | 6/2015 | Clough |
| 9,098,984 B2 | 8/2015 | Heubel |
| 9,135,791 B2 | 9/2015 | Nakamura |
| 9,436,280 B2 | 9/2016 | Tartz |
| 9,459,632 B2 | 10/2016 | Houston |
| 9,630,098 B2 | 4/2017 | Mikhailov |
| 9,753,537 B2 | 9/2017 | Obana |
| 9,792,501 B1 | 10/2017 | Maheriya |
| 9,846,484 B2 | 12/2017 | Shah |
| 9,946,347 B2 | 4/2018 | Nakagawa |
| 9,952,670 B2 | 4/2018 | Watanabe |
| 9,983,671 B2 | 5/2018 | Adachi |
| 10,109,161 B2 | 10/2018 | Shah |
| 10,150,029 B2 | 12/2018 | Yamano et al. |
| 10,175,761 B2 | 1/2019 | Cruz-Hernandez |
| 10,347,093 B2 | 7/2019 | Rihn |
| 10,394,326 B2 | 8/2019 | Ono |
| 10,444,837 B2 | 10/2019 | Takeda |
| 10,969,867 B2 | 4/2021 | Nakagawa |
| 10,981,053 B2 | 4/2021 | Nakagawa |
| 2002/0030663 A1 | 3/2002 | Goldenberg |
| 2002/0080112 A1 | 6/2002 | Braun |
| 2002/0163498 A1* | 11/2002 | Chang .................. G06T 11/206 345/156 |
| 2003/0030619 A1 | 2/2003 | Martin |
| 2003/0212555 A1 | 11/2003 | van Santen |
| 2004/0220812 A1 | 11/2004 | Bellomo |
| 2005/0134562 A1 | 6/2005 | Grant |
| 2007/0091063 A1 | 4/2007 | Nakamura |
| 2007/0248235 A1 | 10/2007 | Hamada |
| 2007/0253178 A1 | 11/2007 | Uchiumi |
| 2008/0064500 A1 | 3/2008 | Satsukawa |
| 2008/0204266 A1 | 8/2008 | Malmberg |
| 2008/0262658 A1 | 10/2008 | Ding |
| 2009/0017911 A1 | 1/2009 | Miyazaki |
| 2010/0016077 A1 | 1/2010 | Longdale |
| 2010/0056208 A1 | 3/2010 | Ashida |
| 2010/0085462 A1 | 4/2010 | Sako |
| 2010/0090815 A1 | 4/2010 | Yamaya |
| 2010/0245237 A1 | 9/2010 | Nakamura |
| 2011/0039606 A1 | 2/2011 | Kim |
| 2011/0075835 A1 | 3/2011 | Hill |
| 2011/0163946 A1 | 7/2011 | Tartz |
| 2012/0028710 A1 | 2/2012 | Furukawa |
| 2012/0232780 A1 | 9/2012 | Delson |
| 2012/0281849 A1 | 11/2012 | Hamada |
| 2013/0057509 A1 | 3/2013 | Cruz-Hernandez |
| 2013/0250502 A1 | 9/2013 | Tossavainen |
| 2013/0261811 A1 | 10/2013 | Yagi |
| 2014/0169795 A1 | 6/2014 | Clough |
| 2014/0176415 A1 | 6/2014 | Buuck |
| 2014/0220520 A1 | 8/2014 | Salamini |
| 2014/0266644 A1 | 9/2014 | Heubel |
| 2014/0361956 A1 | 12/2014 | Mikhailov |
| 2015/0042484 A1 | 2/2015 | Bansal |
| 2015/0059086 A1 | 3/2015 | Clough |
| 2015/0070261 A1 | 3/2015 | Saboune |
| 2015/0081110 A1 | 3/2015 | Houston |
| 2015/0273322 A1 | 10/2015 | Nakagawa |
| 2015/0297990 A1* | 10/2015 | Mahlmeister .......... A63F 13/42 463/37 |
| 2015/0302854 A1 | 10/2015 | Clough |
| 2015/0323996 A1 | 11/2015 | Obana |
| 2016/0012687 A1 | 1/2016 | Obana |
| 2016/0054797 A1 | 2/2016 | Tokubo |
| 2016/0124707 A1 | 5/2016 | Ermilov |
| 2016/0132117 A1 | 5/2016 | Asachi |
| 2016/0162025 A1 | 6/2016 | Shah |
| 2016/0214007 A1 | 7/2016 | Yamashita |
| 2016/0258758 A1 | 9/2016 | Enokido |
| 2016/0310844 A1 | 10/2016 | Yamashita |
| 2016/0342213 A1 | 11/2016 | Endo |
| 2017/0038841 A1 | 2/2017 | Takeda |
| 2017/0045991 A1 | 2/2017 | Watanabe |
| 2017/0053502 A1 | 2/2017 | Shah |
| 2017/0061784 A1 | 3/2017 | Clough |
| 2017/0092084 A1 | 3/2017 | Rihn |
| 2017/0097681 A1 | 4/2017 | Ono |
| 2017/0139479 A1 | 5/2017 | Shimotani |
| 2017/0180863 A1 | 6/2017 | Biggs |
| 2017/0205883 A1 | 7/2017 | Tanaka |
| 2017/0235364 A1 | 8/2017 | Nakamura |
| 2017/0242486 A1 | 8/2017 | Grant |
| 2018/0067313 A1 | 3/2018 | Sako |
| 2018/0098583 A1 | 4/2018 | Keller |
| 2018/0203509 A1 | 7/2018 | Yamano |
| 2019/0105563 A1 | 4/2019 | Yamano |
| 2019/0278372 A1 | 9/2019 | Nakagawa |
| 2019/0332174 A1 | 10/2019 | Nakagawa |
| 2019/0334426 A1 | 10/2019 | Culbertson |
| 2019/0369730 A1 | 12/2019 | Marchant |
| 2020/0061459 A1 | 2/2020 | Nakagawa |
| 2020/0061460 A1 | 2/2020 | Nakagawa |
| 2020/0070047 A1 | 3/2020 | Nakagawa |
| 2020/0122028 A1 | 4/2020 | Konishi |
| 2020/0225755 A1 | 7/2020 | Lee |
| 2020/0238168 A1 | 7/2020 | Konishi |
| 2020/0238169 A1 | 7/2020 | Konishi |
| 2020/0246692 A1 | 8/2020 | Nakagawa |
| 2020/0282310 A1 | 9/2020 | Nakagawa |
| 2020/0324194 A1 | 10/2020 | Enokido |
| 2020/0359687 A1 | 11/2020 | Scatterday |
| 2021/0121776 A1 | 4/2021 | Nakagawa |

FOREIGN PATENT DOCUMENTS

| | | |
|---|---|---|
| JP | 2002199056 A | 7/2002 |
| JP | 2003228453 A | 8/2003 |
| JP | 2004129120 A | 4/2004 |
| JP | 2004157944 A | 6/2004 |
| JP | 2005058404 A | 3/2005 |
| JP | 2005190465 A | 7/2005 |
| JP | 2005332063 A | 12/2005 |
| JP | 3132531 U | 6/2007 |
| JP | 2007324829 A | 12/2007 |
| JP | 2009037582 A | 2/2009 |
| JP | 2009183751 A | 8/2009 |
| JP | 2011501296 A | 1/2011 |
| JP | 2011183374 A | 9/2011 |
| JP | 2012103852 | 5/2012 |
| JP | 2012226482 A | 11/2012 |
| JP | 2013507059 A | 2/2013 |
| JP | 2013052046 A | 3/2013 |
| JP | 2013054645 A | 3/2013 |
| JP | 2013516708 A | 5/2013 |
| JP | 2013145589 A | 7/2013 |
| JP | 2013243604 A | 12/2013 |
| JP | 2014179984 A | 9/2014 |
| JP | 2014528120 A | 10/2014 |
| JP | 2015053038 A | 3/2015 |
| JP | 2015118605 A | 6/2015 |
| JP | 2015121983 A | 7/2015 |
| JP | 2015185137 A | 10/2015 |
| JP | 2015200994 A | 11/2015 |
| JP | 2015215712 A | 12/2015 |

(56) References Cited

FOREIGN PATENT DOCUMENTS

| | | | |
|---|---|---|---|
| JP | 2015225521 A | 12/2015 | |
| JP | 2015228064 A | 12/2015 | |
| JP | 2015230516 A | 12/2015 | |
| JP | 2015231098 A | 12/2015 | |
| JP | 2016002797 A | 1/2016 | |
| JP | 2016131018 A | 7/2016 | |
| JP | 2016527601 A1 | 9/2016 | |
| JP | 2017037523 A | 2/2017 | |
| JP | 2017062788 A | 3/2017 | |
| JP | 2017063916 A | 4/2017 | |
| JP | 2018523863 A | 8/2018 | |
| WO | 02073385 A1 | 9/2002 | |
| WO | 2008078523 A1 | 7/2008 | |
| WO | 2009035100 A1 | 3/2009 | |
| WO | 2015059887 A1 | 4/2015 | |
| WO | 2015121971 A1 | 8/2015 | |
| WO | 2015151380 A1 | 10/2015 | |
| WO | 2016038953 A1 | 3/2016 | |
| WO | 2016186041 A1 | 11/2016 | |
| WO | 2017043610 A1 | 3/2017 | |

OTHER PUBLICATIONS

International Preliminary Report on Patentability and Written Opinion for corresponding PCT Application No. PCT/JP2017/044074, 15 pages, dated Jun. 27, 2019.
Notification of Reason for Refusal for related JP Patent Application No. JP 2018-556628, 17 pages, dated Feb. 18, 2020.
International Preliminary Report on Patentability and Written Opinion for related PCT Application No. PCT/JP2017/033925 16 pages, dated Oct. 31, 2019.
International Preliminary Report on Patentability and Written Opinion for related PCT Application No. PCT/JP2017/015740 14 pages, dated Oct. 31, 2019.
Notice of Reasons for Refusal for corresponding JP Application No. 2019-537506, 4 pages dated Nov. 18, 2020.
Office Action for related U.S. Appl. No. 16/500,651, 7 pages, dated Apr. 16, 2020.
Office Action for related U.S Appl. No. 16/345,071, 10 pages, dated Feb. 19, 2020.
International Search Report for related PCT Application No. PCT/JP2017/044074, 4 pages, dated Jan. 16, 2018.
International Search Report for related PCT Application No. PCT/JP2017/044072, 4 pages, dated Jan. 16, 2018.
International Preliminary Report on Patentability and Written Opinion for related PCT Application No. PCT/JP2017/044072, 15 pages, dated Jun. 27, 2019.
International Search Report for related PCT Application No. PCT/JP2017/044073, 2 pages, dated Jan. 23, 2018.
International Preliminary Report on Patentability and Written Opinion for related PCT Application No. PCT/JP2017/044073, 10 pages, dated Jun. 27, 2019.
International Preliminary Report on Patentability and Written Opinion for related PCT Application No. PCTJP2017044074, 12 pages, dated Jun. 18, 2019.
International Search Report for related PCT Application No. PCT/JP2017/015563, 2 pages, dated Jun. 13, 2017.
International Search Report for related PCT Application No. PCT/JP2017/033925, 4 pages, dated Nov. 7, 2017.
International Search Report for related PCT Application No. PCT/JP2017/015740, 4 pages, dated Jul. 4, 2017.
International Search Report for related PCT Application No. PCT/JP2017/016552, 2 pages, dated Jun. 20, 2017.
International Preliminary Report on Patentability and Written Opinion for related PCT Application No. PCTJP2017044075, 15 pages, dated Jun. 27, 2019.
International Preliminary Report on Patentability and Written Opinion for related PCT Application No. PCT/JP2017/016552, 13 pages, dated Nov. 7, 2019.
International Search Report for related PCT Application No. PCT/JP2017/030344, 4 pages, dated Oct. 10, 2017.
International Search Report for related PCT Application No. PCT/JP2017/030345, 2 pages, dated Sep. 26, 2017.
International Search Report for corresponding PCT Application No. PCT/JP2017/030909, 3 pages, dated Sep. 26, 2017.
Notice of Reasons for Refusal for corresponding JP Application No. 2019513214, 12 pages, dated Apr. 28, 2020.
International Preliminary Report on Patentability and Written Opinion for related PCT Application No. PCT/JP2017/030344, 13 pages, dated Mar. 5, 2020.
International Preliminary Report on Patentability and Written Opinion for related PCT Application No. PCT/JP2017/030345, 11 pages, dated Mar. 5, 2020.
International Preliminary Report on Patentability and Written Opinion for related PCT Application No. PCT/JP2017/030932, 16 pages, dated Mar. 12, 2020.
International Preliminary Report on Patentability and Written Opinion for corresponding PCT Application No. PCT/JP2017/0030909, 11 pages, dated Mar. 12, 2020.
Decision to Grant for related JP Application No. JP2019-513523, 5 pages, dated Dec. 24, 2020.
Notification of Reasons for Refusal for related JP Application No. JP2019-537507, 8 pages, dated Dec. 14, 2020.

\* cited by examiner

VIBRATION CONTROL APPARATUS, VIBRATION CONTROL METHOD, AND PROGRAM

TECHNICAL FIELD

The present invention relates to a vibration control apparatus, a vibration control method, and a program.

BACKGROUND ART

In some cases, a device used while it is attached to or held by the body of a user, such as an operating device connected to a home gaming machine for use, includes a vibration mechanism for vibrating a part or the whole of the device. A vibration device including such a vibration mechanism is able to present a vibration to the user by operating the vibration mechanism at an appropriate time point.

SUMMARY

Technical Problem

Under normal conditions, a process performed by an application program determines the way of vibrating the above-mentioned conventional vibration device. For example, a vibration corresponding to the feel of a target object virtually touched by a user within a game is presented as a tactile sensation.

In some cases, however, certain users may want to generate a relatively strong vibration to vibrate the vibration device instead of using information regarding tactile sensation specified by the application program.

The present invention has been made in view of the above circumstances. An object of the present invention is to provide a vibration control apparatus, a vibration control method, and a program that are capable of adjusting the way of vibrating a vibration mechanism in accordance, for example, with user preferences.

Solution to Problem

According to an aspect of the present invention, there is provided a vibration control apparatus for vibrating a vibration mechanism. The vibration control apparatus includes a correction information reception section, a vibration data acquisition section, and a vibration control section. The correction information reception section receives, from a user, correction information specifying a correction to be made when the vibration mechanism is to be vibrated. The vibration data acquisition section acquires tactile sensory vibration data descriptive of a vibration causing the user to feel a tactile sensation. The vibration control section obtains corrected vibration data by correcting the acquired tactile sensory vibration data in accordance with the correction information, and vibrates the vibration mechanism by using the corrected vibration data.

DESCRIPTION OF EMBODIMENT

Figure 1:
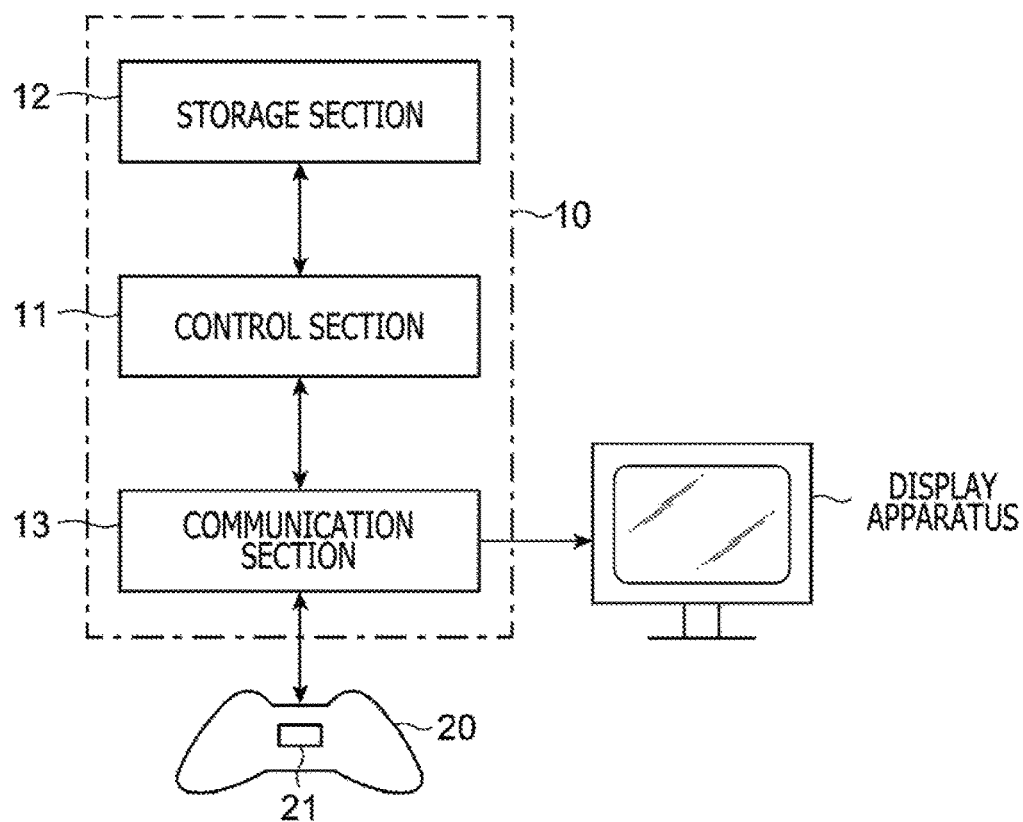
FIG. 1 is a block configuration diagram illustrating an example of a system including a vibration control apparatus according to an embodiment of the present invention.

An embodiment of the present invention will now be described with reference to the accompanying drawings. A vibration control apparatus 10 according to the embodiment of the present invention may be, for example, a home gaming machine or a personal computer. As illustrated in FIG. 1, the vibration control apparatus 10 includes a control section 11, a storage section 12, and a communication section 13, and is connected to a vibration device 20 having a built-in vibration mechanism 21.

The vibration device 20 is a game controller or another device that is used while it is held by a hand of a user or worn on the body of the user. The vibration device 20 presents a vibration to the user by operating its internal vibration mechanism 21.

The vibration mechanism 21 may be, for example, a linear resonance actuator, a voice coil motor, an eccentric motor, or another vibration generation element. Further, the vibration mechanism 21 may include a plurality of voice coil motors or include a plurality of types of vibration generation elements such as a combination of a voice coil motor and an eccentric motor. Moreover, the vibration device 20 may include an operating button, a lever, and other operating elements that receive a user operation.

The control section 11 of the vibration control apparatus 10 is a program control device such as a central processing unit (CPU), and adapted to perform various information processes in accordance with a program stored in the storage section 12. In the present embodiment, the control section 11 receives, from the user, correction information specifying the correction to be made when the vibration mechanism 21 of the vibration device 20 is to be vibrated. Further, in accordance, for example, with a process performed by an application program, the control section 11 acquires tactile sensory vibration data descriptive of a vibration causing the user to feel a tactile sensation. Then, the control section 11 obtains corrected vibration data by correcting the acquired tactile sensory vibration data in accordance with the correction information, and exercises control to vibrate the vibration mechanism 21 by using the corrected vibration data. Processing performed by the control section 11 will be described in detail later.

The storage section 12 is, for example, a memory device, and adapted to store the program to be executed by the control section 11. The program may be stored on a computer-readable, non-transitory storage medium, supplied, and copied into the storage section 12. The storage section 12 further operates as a work memory for the control section 11.

The communication section 13 includes a universal serial bus (USB) or another serial interface or a Bluetooth (registered trademark) or another wireless communication interface. The vibration control apparatus 10 is communicatively connected to the vibration device 20 through the communication section 13. In the present embodiment, the communication section 13 transmits a control signal for operating the vibration mechanism 21 in accordance with an instruction from the control section 11. Further, the communication section 13 includes a communication interface for wiredly or wirelessly communicating with a display apparatus such as an undepicted display, a home television set, or a head-mounted display. The vibration control apparatus 10 transmits data on video, which is to be displayed on the display apparatus, to the display apparatus through the communication section 13.

Figure 2:
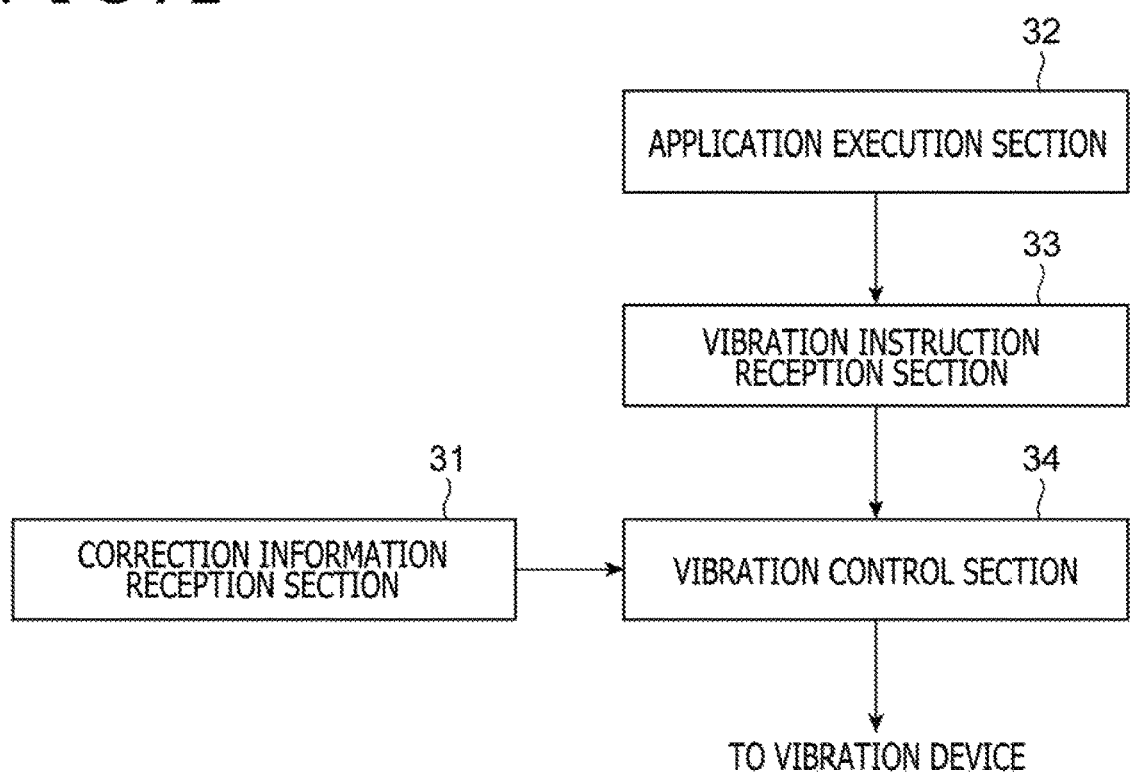
FIG. 2 is a functional block diagram illustrating an example of the vibration control apparatus according to the embodiment of the present invention.

Operations of the control section 11 in the vibration control apparatus 10 will now be described. As illustrated in FIG. 2, the control section 11 in the present embodiment functionally includes a correction information reception section 31, an application execution section 32, a vibration instruction reception section 33, and a vibration control section 34. The functions of these sections are implemented when the control section 11 operates in accordance with the program stored in the storage section 12.

The correction information reception section 31 receives correction information inputted by the user. Here, it is assumed that the correction information specifies the correction to be made to a vibration when the later-described vibration control section 34 outputs a control command for vibrating the vibration device 20. It is also assumed here that the user uses the correction information to specify a correction for obtaining a stronger vibration rather than the reality of a tactile sensation.

Figure 3:
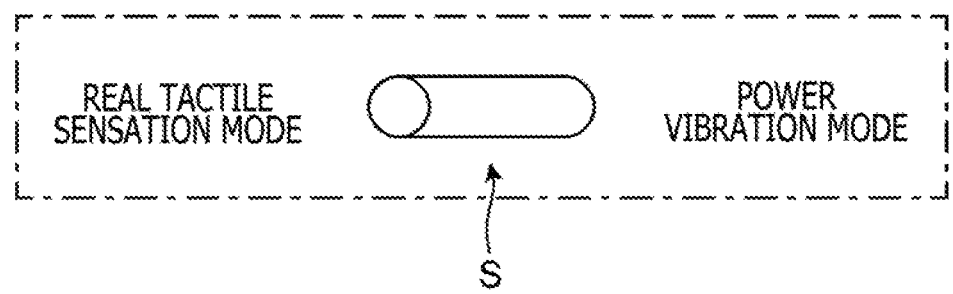
FIG. 3 is an explanatory diagram illustrating an example of a correction instruction setting screen provided by the vibration control apparatus according to the embodiment of the present invention.

As an example, the correction information reception section 31 outputs a correction information input guidance screen image illustrated in FIG. 3 in order to display it on the display apparatus. In accordance with the correction information input guidance screen image displayed on a screen of the display apparatus, the user inputs correction information by operating an operating button disposed on the vibration device 20. The example of FIG. 3 assumes that a switch (S) alternates between a "real tactile sensation mode" and a "power vibration mode" each time the user operates a predetermined operating button. Here, it is assumed that the correction information is unavailable in a case where the "real tactile sensation mode" is selected by the user, and that the correction information is to be received in a case where the "power vibration mode" is selected by the user. Further, the present example assumes that a switch is used to alternate between the "real tactile sensation mode" and the "power vibration mode." However, the present embodiment is not limited to such switching. An alternative is to use a slider for selecting one of different levels of "power vibration" (use an interface capable of inputting one of setting values indicative of a plurality of different levels). In this case, a process of using values indicative of different levels of power vibration may be performed.

The application execution section 32 is implemented when the control section 11 executes an application program such as a game. The application execution section 32 performs various processes in accordance, for example, with user operations performed on the vibration device 20, and displays the results of such processes on the screen of the display apparatus. For example, the application execution section 32 may build a virtual space where various virtual objects are disposed, and present an image depicting the inside of the virtual space to the user.

Further, in accordance with a process performed by the application execution section 32, the application execution section 32 outputs vibration instruction data for vibrating the vibration device 20. The vibration instruction data includes data defining the vibration of the vibration mechanism 21 of the vibration device 20. For example, tactile sensory vibration data descriptive of a tactile sensation of a target object virtually touched by the user (e.g., a vibration based on the texture of a target object surface or a vibration of the target object such as an impact produced when the trigger of a gun, which is the target object, is pulled) is outputted as the vibration instruction data during application processing.

Data obtained by encoding the waveform of the vibration to be generated by the vibration mechanism 21 is a concrete example of the vibration instruction data. In the present embodiment, the vibration instruction data may be waveform data concerning the whole period of time during which the vibration continues or a set of waveform data descriptive of each of a plurality of waveform elements obtained by dividing the waveform of the vibration into predetermined time intervals.

Further, in a case where waveform data is used as the vibration instruction data as described above, the actual operation of the vibration mechanism 21 is defined in accordance with the amplitude and frequency of a vibration waveform. Such vibration instruction data may be written in a format similar to that of audio data (e.g., a format descriptive of a waveform). Furthermore, the vibration instruction data in the present example generally represents a waveform that is obtained when vibrations of a plurality of frequencies are superimposed on each other, as is the case with the audio data. The vibration instruction data to be outputted from the application execution section 32 is stored in a buffer area provided in the storage section 12.

The vibration instruction reception section 33 receives, from the application execution section 32, a vibration instruction for vibrating the vibration device 20. More specifically, the vibration instruction reception section 33 receives the vibration instruction by reading the vibration instruction data that is stored in the buffer area by the application execution section 32, and then outputs the received vibration instruction to the vibration control section 34. In a case where the vibration instruction data is divided into the predetermined time intervals, the vibration instruction reception section 33 receives the vibration instruction by sequentially and successively reading the divided vibration instruction data that is stored in the buffer area by the application execution section 32.

In accordance with a vibration instruction received by the vibration instruction reception section 33, the vibration control section 34 outputs, to the vibration device 20, the control command for operating the vibration mechanism 21. The vibration device 20 generates a vibration having a strength and frequency based on the vibration instruction by operating the vibration mechanism 21 in accordance with the control command. This makes it possible to vibrate the main body of the vibration device 20 in accordance with the situation of a game or the like executed by the application execution section 32 according to the present embodiment, and present the resulting vibration to the user.

Further, when the correction information is received by the correction information reception section 31, the vibration control section 34 according to the present embodiment corrects the vibration instruction in accordance with the correction information, and outputs, to the vibration device 20, a control command for operating the vibration mechanism 21 in accordance with the corrected vibration instruction. Allowing the vibration control section 34 to perform the above-described correction process enables the user to adjust the vibration in accordance, for example, with user preferences. Concrete examples of the correction process performed based on the correction information are described below.

In a case where the designated correction is for demanding a stronger vibration rather than the reality of a tactile sensation, the present embodiment may use the following correction methods for correcting the tactile sensory vibration data:

(1) Outputting other waveform data (e.g., a sine wave having a predetermined frequency) instead of the tactile sensory vibration data (2) Applying a filter to the tactile sensory vibration data so as to produce a sensation of impact (3) Increasing the minimum value of amplitude among the tactile sensory vibration data The present embodiment may use the following correction methods for changing the vibration mechanism 21 to be vibrated:

(4) In a case where the vibration mechanism 21 includes a plurality of vibration generation elements, increasing the number of vibration generation elements to be vibrated (in a case where a level of power vibration is inputted, the number of vibration generation elements may be increased such that the higher the level, the larger the number of vibration generation elements to be vibrated)

(5) In a case where the vibration mechanism 21 includes a plurality of types of vibration generation elements, changing the types of the vibration generation elements to be vibrated so as to obtain a stronger vibration Corrections made by using tactile sensory vibration data correction methods (1) to (3) will now be described.

First of all, the method (1) of outputting other waveform data (e.g., a sine wave having a predetermined frequency) instead of the tactile sensory vibration data will be described. In this example, in accordance with a vibration instruction received by the vibration instruction reception section 33, the vibration control section 34 outputs a vibration instruction concerning a sine wave having a predetermined frequency during a period of the presentation of the tactile sensory vibration data instead of the tactile sensory vibration data included in the vibration instruction. The vibration instruction concerning the sine wave is then handled as the corrected vibration instruction so that the vibration control section 34 generates a control command for operating the vibration mechanism 21 in accordance with the corrected vibration instruction, and outputs the generated control command to the vibration device 20. This example assumes that the outputted vibration instruction concerns a sine wave. Alternatively, however, the vibration instruction concerning, for example, a sawtooth wave or a triangular wave may be outputted, and the wave is not limited to the sine wave.

Figure 4:
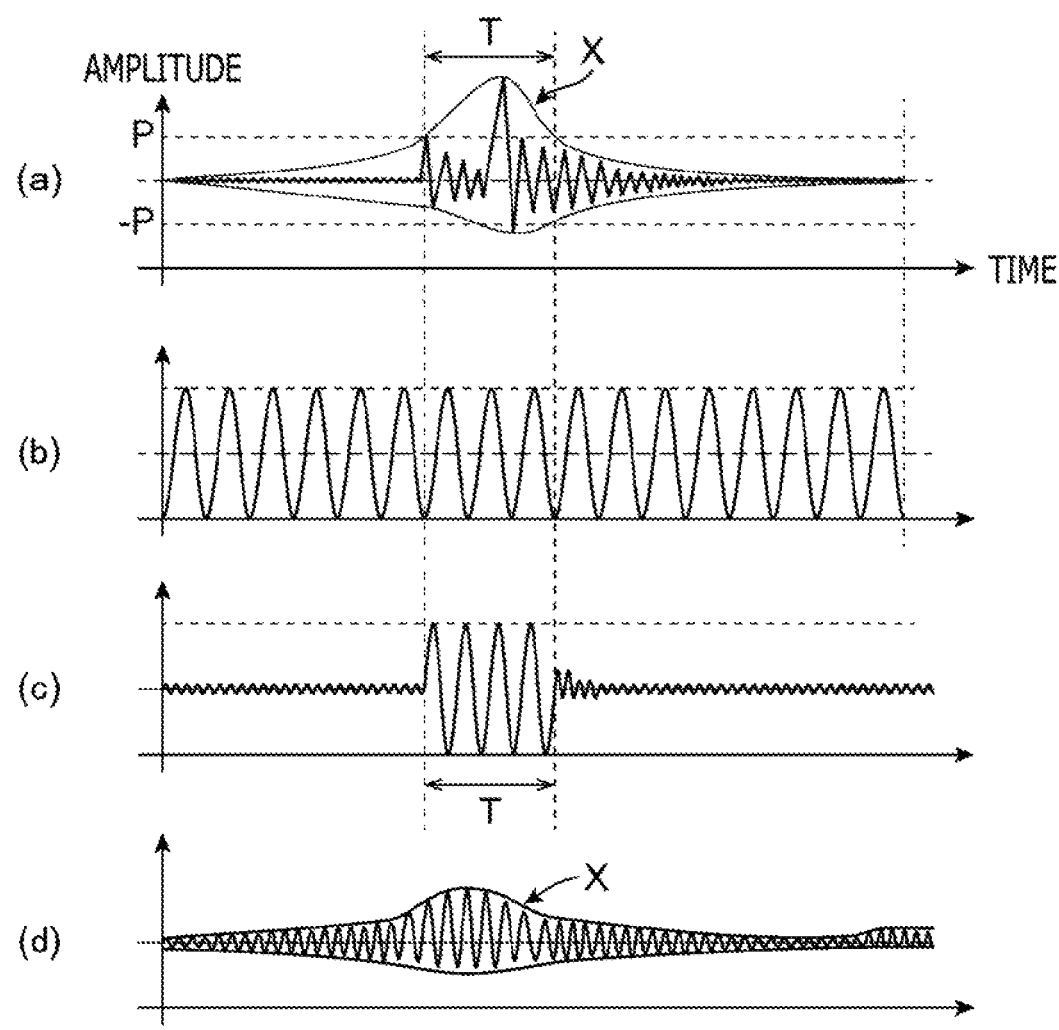
FIG. 4 is an explanatory diagram illustrating examples of vibration waveforms to be processed by the vibration control apparatus according to the embodiment of the present invention.

According to the above example, when the tactile sensory vibration data illustrated in part (a) of FIG. 4 is received as the vibration instruction, the vibration control section 34 generates and outputs vibration data concerning a sine wave having a predetermined frequency during a period of time during which the tactile sensory vibration data continues (part (b) of FIG. 4).

Further, the vibration control section 34 may generate and output vibration data concerning a sine wave having a predetermined frequency during a period of time (T) during which a predetermined threshold value (P) is exceeded by the absolute value of the amplitude of the envelope ((X) in FIG. 4) of a waveform described by the tactile sensory vibration data, that is, during a period of time during which the threshold value ±P is exceeded by the envelope (part (c) of FIG. 4). In this instance, the tactile sensory vibration data associated with the period of time (T) (not greater than the threshold value (P)) may be outputted as is during a period other than the period of time (T).

Furthermore, the vibration control section 34 may determine the amplitude of corrected vibration data in accordance with the amplitude of the tactile sensory vibration data. In other words, the vibration control section 34 may subject the vibration data concerning a sine wave having a predetermined frequency to amplitude modulation by using the envelope ((X) in FIG. 4) of a waveform described by the tactile sensory vibration data, and generate and output a modulated sine wave in such a manner that the shape of the envelope of the sine wave having the predetermined frequency coincides with the shape of the envelope of the waveform described by the tactile sensory vibration data (part (d) of FIG. 4).

The sine wave used in the above example of the present embodiment may have a frequency close to the natural frequency f0 of the vibration mechanism 21 or vibration device 20 (the frequency at which the vibration mechanism 21 or the vibration device 20 vibrates most strongly when the vibration mechanism 21 is controlled at the same voltage). In such a case, a more enhanced vibration is presented to the user. Further, the amplitude of the sine wave (the amplitude of the envelope) may be equal to the maximum value of vibration of the vibration mechanism 21 or close to that maximum value (e.g., not smaller than 80% of the maximum value).

In a case where a level of power vibration is inputted in the above example, the above-mentioned threshold value (P) may be changed. As an example, the threshold value (P) may be decreased with an increase in the level of power vibration inputted as an example in order to increase opportunities where vibration data concerning a sine wave having a predetermined frequency is outputted.

The method (2) of applying a filter to the tactile sensory vibration data so as to produce a sensation of impact will now be described. In this example, in accordance with a vibration instruction received by the vibration instruction reception section 33, the vibration control section 34 applies a predetermined filter to the tactile sensory vibration data included in the vibration instruction. As this filter, a Wiener filter or another publicly known enhancement filter may be used.

The vibration control section 34 regards the filtered tactile sensory vibration data as the corrected vibration instruction, generates a control command for operating the vibration mechanism 21 in accordance with the corrected vibration instruction, and outputs the generated control command to the vibration device 20.

In a case where a level of power vibration is inputted in the above example, the parameters of the filter to be applied may be changed so that the higher the level, the more enhanced the generated vibration.

Additionally, the method (3) of increasing the minimum value of amplitude among the tactile sensory vibration data will now be described. In this example, in accordance with a vibration instruction received by the vibration instruction reception section 33, the vibration control section 34 makes a correction so as to relatively increase the strength of vibration corresponding to a portion of the tactile sensory vibration data included in the vibration instruction that indicates a vibration strength below a predetermined threshold value. For example, in the tactile sensory vibration data, as regards a period during which the amplitude (the absolute value of amplitude) of a waveform described by the tactile sensory vibration data, that is, the absolute value of the amplitude of the envelope of the waveform, is equivalent to a value K (K<P) smaller than the predetermined threshold value P, the strength of vibration indicated by the tactile sensory vibration data (not the amplitude of the envelope, but the amplitude of the vibration of the tactile sensory vibration data) within the period is multiplied by a correction ratio P/K for correction purposes to obtain a waveform vibrating at least at an amplitude P.

The above-mentioned threshold value P of amplitude may be a value relatively close to the maximum amplitude, for example, 90% of the maximum amplitude at which the vibration mechanism 21 is capable of vibrating.

Further, in the above case, the correction to be made (correction ratio) may be varied from one frequency band to another. More specifically, in a case where the vibration instruction data includes vibrations having a plurality of frequencies, the resulting sensation varies from one frequency to another, that is, for example, humans are relatively unlikely to feel high-frequency vibrations and are likely to feel low-frequency vibrations. Therefore, if the amplitudes of all frequencies are similarly increased for correction purposes, a vibration at a particular frequency may be less likely to be felt than a vibration at another frequency. In view of such circumstances, the vibration control section 34 may correct the vibration level of each of a plurality of frequency bands at a correction ratio in order to make the user feel as if the overall strength of vibration is corrected.

Specifically, for example, the vibration control section 34 multiplies only the vibration of a predetermined frequency band B1 by P/K for corrections purposes when the amplitude K of the envelope is greater than a second threshold value P' (P'<P), and multiplies the vibrations of frequency bands (e.g., all frequency bands) wider than the predetermined frequency band B1 by P/K for correction purposes when the amplitude K of the envelope is smaller than the second threshold value P'.

If a level of power vibration is inputted in the above example, the above threshold values P and P' may be changed as appropriate. For example, as the inputted level of power vibration rises, the threshold value P is increased to increase the amplitude of vibration.

Examples where a Vibration Other than Described by Tactile Sensory Vibration Data is Included The foregoing description assumes that the application execution section 32 outputs the tactile sensory vibration data. However, the present embodiment is not limited to such a configuration. For example, the application execution section 32 may output not only the tactile sensory vibration data, but also data concerning an additional vibration to be presented simultaneously with the vibration described by the tactile sensory vibration data (e.g., vibration data for presenting a force sensation; hereinafter referred to as the additional vibration data).

In the above case, the vibration instruction reception section 33 receives, as a vibration instruction from the application execution section 32, not only the tactile sensory vibration data but also the additional vibration data descriptive of the vibration to be presented simultaneously with the vibration described by the tactile sensory vibration data.

More specifically, the vibration instruction reception section 33 receives the vibration instruction by reading the tactile sensory vibration data and additional vibration data stored in the buffer area by the application execution section 32, and outputs the received vibration instruction to the vibration control section 34.

If, in the above instance, the tactile sensory vibration data and additional vibration data are divided into the predetermined time intervals, the vibration instruction reception section 33 receives the vibration instruction by sequentially and successively reading the divided vibration instruction data that are stored in the buffer area by the application execution section 32.

In the above example, when outputting a control command for operating the vibration mechanism 21 in accordance with the vibration instruction received by the vibration instruction reception section 33 to the vibration device 20, the vibration control section 34 generates the control command for the vibration mechanism 21 so as to generate a vibration that is obtained by adding the vibration described by the tactile sensory vibration data included in the vibration instruction to the vibration described by the additional vibration data, and outputs the generated control command to the vibration device 20. In a case where there are a plurality of types of additional vibration data, the vibration to be generated is determined by adding the sum of individual vibrations described by such additional vibration data to the vibration described by the tactile sensory vibration data. Upon receipt of the control command, the vibration device 20 operates the vibration mechanism 21 in accordance with the control command.

Further, upon receipt of correction information in the "power vibration mode" selected by the user, the vibration control section 34 corrects the tactile sensory vibration data, for example, by using the following methods:

(1) Outputting other waveform data (e.g., a sine wave having a predetermined frequency) instead of the tactile sensory vibration data (2) Applying a filter to the tactile sensory vibration data so as to produce a sensation of impact (3) Increasing the minimum value of amplitude among the tactile sensory vibration data (4) In a case where the vibration mechanism 21 includes a plurality of vibration generation elements, increasing the number of vibration generation elements to be vibrated (5) In a case where the vibration mechanism 21 includes a plurality of types of vibration generation elements, changing the types of the vibration generation elements to be vibrated so as to obtain a stronger vibration Furthermore, the vibration control section 34 does not correct the additional vibration data in accordance with the correction information received in the "power vibration mode" selected by the user, and outputs, to the vibration device 20, a control command for controlling the vibration mechanism 21 so as to present a vibration that is obtained by adding the vibration described by the additional vibration data to the vibration described by the tactile sensory vibration data corrected in the above-described manner (or, for example, a sine wave having a predetermined frequency that is outputted instead of the tactile sensory vibration data).

Moreover, in a case where the sum of a vibration described by the corrected tactile sensory vibration data and a vibration based on the additional vibration data is to be presented as described above, the tactile sensory vibration data may be corrected so that a vibration described by the corrected tactile sensory vibration data is slightly weaker (may be corrected to obtain a smaller amplitude) than when no additional vibration data is to be used. In a case where a sine wave or another wave having a predetermined frequency is to be outputted instead of the tactile sensory vibration data, an alternative is to slightly decrease the amplitude of the sine wave or another wave for correction purposes or change the number or type of vibration mechanisms 21 to be vibrated. This will prevent the vibration described by the additional vibration data from being imperceptible due to the vibration based on the corrected tactile sensory vibration data.

Likewise, if a level of power vibration is inputted by the user in a case where the sum of a vibration described by the corrected tactile sensory vibration data and a vibration based on the additional vibration data is to be presented, a correction may be made so that the higher the inputted level, the more enhanced the presented vibration. Even in this case, the tactile sensory vibration data may be corrected so that a vibration based on the corrected tactile sensory vibration data is slightly weaker (may be corrected to obtain a smaller amplitude) than when no additional vibration data is to be used.

REFERENCE SIGNS LIST

10 Vibration control apparatus, 11 Control section, 12 Storage section, 13 Communication section, 20 Vibration device, 21 Vibration mechanism, 31 Correction information reception section, 32 Application execution section, 33 Vibration instruction reception section, 34 Vibration control section.

The invention claimed is:

1. A vibration control apparatus for vibrating a vibration mechanism, the vibration control apparatus comprising:
a correction information reception section that receives, from a user, correction information specifying a correction to be made when the vibration mechanism is to be vibrated;
a vibration data acquisition section that acquires tactile sensory vibration data including a waveform vibration data that is descriptive of a vibration causing the user to feel a tactile sensation, where the waveform vibration data includes a time varying amplitude signal having one or more frequencies, and is obtained via command from an application program; and
a vibration control section that obtains corrected vibration data by correcting the acquired tactile sensory vibration data in accordance with the correction information, and vibrates the vibration mechanism by using the corrected vibration data, wherein:
when the correction information reception section receives correction information specifying a correction to be made for enhancement correction, the vibration control section makes a correction on the tactile sensory vibration data by replacing the waveform vibration data with another waveform vibration data in accordance with the correction information, and vibrates the vibration mechanism in accordance with the correction, and
the other waveform vibration data includes a sine wave having a predetermined frequency, which is different than the one or more frequencies of the waveform vibration data of the tactile sensory vibration data.

2. The vibration control apparatus according to claim 1, wherein
the vibration control section corrects the tactile sensory vibration data by replacing with other waveform vibration data in accordance with the correction information, and vibrates the vibration mechanism in accordance with the corrected vibration data, and
the vibration control section determines an amplitude of the corrected vibration data in accordance with an amplitude of the acquired tactile sensory vibration data.

3. A vibration control method for causing a computer to vibrate a vibration mechanism, the vibration control method comprising:
receiving, from a user, correction information specifying a correction to be made when the vibration mechanism is to be vibrated;
acquiring tactile sensory vibration data including a waveform vibration data that is descriptive of a vibration causing the user to feel a tactile sensation, where the waveform vibration data includes a time varying amplitude signal having one or more frequencies, and is obtained via command from an application program; and
obtaining corrected vibration data by correcting the acquired tactile sensory vibration data in accordance with the correction information, and vibrating the vibration mechanism by using the corrected vibration data, wherein:
when the receiving includes receiving correction information specifying a correction to be made for enhancement correction, the obtaining includes making a correction on the tactile sensory vibration data by replacing the waveform vibration data with another waveform vibration data in accordance with the correction information, and vibrating the vibration mechanism in accordance with the correction, and
the other waveform vibration data includes a sine wave having a predetermined frequency, which is different than the one or more frequencies of the waveform vibration data of the tactile sensory vibration data.

4. A non-transitory, computer readable storage medium containing a computer program, which when executed by a computer, causes the computer to carry out actions, comprising:
receiving, from a user, correction information specifying a correction to be made when a vibration mechanism is to be vibrated;
acquiring tactile sensory vibration data including a waveform vibration data that is descriptive of a vibration causing the user to feel a tactile sensation, where the waveform vibration data includes a time varying amplitude signal having one or more frequencies, and is obtained via command from an application program; and
obtaining corrected vibration data by correcting the acquired tactile sensory vibration data in accordance with the correction information, and vibrating the vibration mechanism by using the corrected vibration data, wherein:
when the receiving includes receiving correction information specifying a correction to be made for enhancement correction, the obtaining includes making a correction on the tactile sensory vibration data by replacing the waveform vibration data with another waveform vibration data in accordance with the correction information, and vibrating the vibration mechanism in accordance with the correction, and
the other waveform vibration data includes a sine wave having a predetermined frequency, which is different than the one or more frequencies of the waveform vibration data of the tactile sensory vibration data.

5. The vibration control apparatus of claim 1, wherein:
the waveform vibration data of the tactile sensory vibration data includes the time varying amplitude signal within a peak amplitude envelope that varies over time; and the other waveform vibration data includes the sine wave having the predetermined frequency within a peak amplitude envelope that does not vary over time.

6. The vibration control apparatus of claim 1, wherein:

the waveform vibration data of the tactile sensory vibration data includes the time varying amplitude signal within a peak amplitude envelope that varies over time, exceeding a magnitude P over an interval of time, and not exceeding the magnitude P outside the interval of time; and the other waveform vibration data includes the sine wave having the predetermined frequency within a peak amplitude envelope that does not vary over time, whether within the interval of time or outside the interval of time.

7. The vibration control apparatus of claim 1, wherein:

the waveform vibration data of the tactile sensory vibration data includes the time varying amplitude signal within a peak amplitude envelope that varies over time, exceeding a magnitude P over an interval of time, and not exceeding the magnitude P outside the interval of time; and the other waveform vibration data includes the sine wave having the predetermined frequency within a peak amplitude envelope of a first level that does not vary over time within the interval of time, and of a second level, lower than the first level outside the interval of time.

8. The vibration control apparatus of claim 1, wherein:

the waveform vibration data of the tactile sensory vibration data includes the time varying amplitude signal within a peak amplitude envelope that varies over time, exceeding a magnitude P over an interval of time, and not exceeding the magnitude P outside the interval of time; and the other waveform vibration data includes the sine wave having the predetermined frequency within a peak amplitude envelope that varies over time in approximation to the peak amplitude envelope of the time varying amplitude signal of the waveform vibration data of the tactile sensory vibration data.

* * * * *